United States Patent
Szarszewski (10) Patent No.: US 8,459,701 B2
(45) Date of Patent: Jun. 11, 2013

(54) DIFFERENTIAL PRESSURE-CONTROLLED LOCKING MECHANISM

(75) Inventor: Maik Szarszewski, Bürgstadt (DE)

(73) Assignee: Airbus Operations GmbH (DE)

( * ) Notice: Subject to any disclaimer, the term of this patent is extended or adjusted under 35 U.S.C. 154(b) by 337 days.

(21) Appl. No.: 12/663,810

(22) PCT Filed: Jun. 5, 2008

(86) PCT No.: PCT/EP2008/004502
§ 371 (c)(1),
(2), (4) Date: Apr. 7, 2010

(87) PCT Pub. No.: WO2008/151756
PCT Pub. Date: Dec. 18, 2008

(65) Prior Publication Data
US 2010/0193637 A1    Aug. 5, 2010

Related U.S. Application Data

(60) Provisional application No. 60/944,137, filed on Jun. 15, 2007.

(30) Foreign Application Priority Data

Jun. 15, 2007   (DE) .......................... 10 2007 027 550

(51) Int. Cl.
*E05B 65/10*   (2006.01)
*B64C 1/14*    (2006.01)
(52) U.S. Cl.
USPC .......................................... 292/21; 244/129.4
(58) Field of Classification Search
USPC ............. 292/21, 91, 93, 137, 161; 244/129.4, 244/129.5
See application file for complete search history.

(56) References Cited

U.S. PATENT DOCUMENTS

| | | | |
|---|---|---|---|
| 4,720,065 A | * | 1/1988 | Hamatani .................. 244/129.5 |
| 5,048,239 A | | 9/1991 | Filitz et al. |

(Continued)

FOREIGN PATENT DOCUMENTS

| | | |
|---|---|---|
| DE | 375328 C1 | 8/1988 |
| DE | 4103014 C1 | 3/1992 |

(Continued)

OTHER PUBLICATIONS

PCT International Search Report for PCT/EP2008/004502 completed by the EP Searching Authority on Oct. 24, 2008.

*Primary Examiner* — Thomas Beach
*Assistant Examiner* — Nathan Cumar
(74) *Attorney, Agent, or Firm* — Carter, DeLuca, Farrell & Schmidt, LLP (57) ABSTRACT

A differential pressure-controlled locking mechanism (10) comprises a housing (12), as well as a first pressure chamber (14) which is arranged in the housing (12) and which is connectable to a first ambient zone. A second pressure chamber, arranged in the housing (12), is connectable to a second ambient zone and is separated from the first pressure chamber (14) by a mobile separating device (18). The separating device (18) is in an inactive position when the pressure in the first pressure chamber (14) is equal to the pressure in the second pressure chamber. Conversely, the separating device (18) is movable from its inactive position into a differential pressure position when a predetermined differential pressure acts on the separating device (18). An actuation element (22), which is held in a first position by the separating device (18) when the separating device (18) is in its inactive position, is movable into a second position when the mobile separating device (18) is in its differential pressure position. A latch (32) is held in a locking position when the actuation element (22) is in its first position, and is movable into an unlocking position when the actuation element (22) is in its second position.

14 Claims, 6 Drawing Sheets

U.S. PATENT DOCUMENTS

| | | | |
|---|---|---|---|
| 5,085,017 A | 2/1992 | Hararat-Tehrani | |
| 5,180,121 A * | 1/1993 | Banks et al. | 244/129.5 |
| 5,305,969 A * | 4/1994 | Odell et al. | 244/129.5 |
| 5,337,977 A * | 8/1994 | Fleming et al. | 244/129.5 |
| 5,379,971 A * | 1/1995 | Kim et al. | 244/129.5 |
| 5,606,829 A | 3/1997 | Hararat-Tehrani | |
| 5,765,883 A * | 6/1998 | Dessenberger et al. | 292/92 |
| 5,871,178 A | 2/1999 | Barnett et al. | |
| 6,168,114 B1 * | 1/2001 | Erben | 244/129.5 |
| 6,902,137 B2 * | 6/2005 | Brzeski et al. | 244/129.5 |
| 7,168,659 B2 * | 1/2007 | Galvani et al. | 244/129.5 |
| 7,861,971 B2 * | 1/2011 | Ponsart et al. | 244/129.5 |
| 2004/0094670 A1 * | 5/2004 | Pratt et al. | 244/129.4 |
| 2004/0239126 A1 * | 12/2004 | Pratt et al. | 292/227 |
| 2007/0089746 A1 | 4/2007 | Mitchell et al. | |
| 2010/0193637 A1 * | 8/2010 | Szarszewski | 244/129.1 |

FOREIGN PATENT DOCUMENTS

| | | |
|---|---|---|
| DE | 4103013 A1 | 8/1992 |
| DE | 4216277 A1 | 11/1993 |
| DE | 102004009017 B3 | 8/2005 |
| EP | 1186531 A2 | 3/2002 |
| EP | 1921006 A | 5/2008 |

* cited by examiner

DIFFERENTIAL PRESSURE-CONTROLLED LOCKING MECHANISM

CROSS-REFERENCE TO RELATED APPLICATIONS

This application is a U.S. national counterpart application of international application serial No. PCT/EP2008/004502 filed Jun. 5, 2008, which claims priority to U.S. Provisional Patent Application No. 60/944,137 filed Jun. 15, 2006 and to German Patent Application No. 102007027550.3 filed Jun. 15, 2007.

The invention relates to a differential pressure-controlled locking mechanism and to a decompression panel, which is equipped with such a differential pressure-controlled locking mechanism and is intended particularly for use in an aircraft.

Currently used commercial aircraft comprise a pressurised cabin, the internal pressure of which during flight operation is kept at an elevated pressure level relative to the outside pressure, i.e. the atmospheric pressure which is reduced at high altitudes, for example by a climate control system supplied with engine bleed air. In general the pressure inside the cabin of a commercial aircraft during flight operation of the aircraft, i.e. when the aircraft is at cruising altitude, usually corresponds approximately to the atmospheric pressure at an altitude of 8000 feet (about 2400 m). A pressurised aircraft cabin conventionally comprises a plurality of zones separated from one another by corresponding dividing walls and/or partition floors, for example the cockpit, passenger compartment, crew rest compartment or cargo areas.

In the event of decompression, i.e. in the event of a pressure drop in a zone of the aircraft cabin which is kept at elevated pressure during the flight, in order to avoid damage to the dividing walls and/or partition floors which separate the aircraft cabin zone affected by the decompression from the aircraft cabin zones adjacent to this zone, pressure equilibration between the aircraft cabin zone affected by the decompression and the aircraft cabin zones adjacent to this zone must be possible in the event of decompression. For this reason, so-called decompression panels are conventionally provided in dividing walls and/or partition floors which are used to separate from one another various zones of an aircraft cabin kept at an elevated pressure relative to the outside pressure.

These decompression panels are integrated into the dividing walls and/or partition floors provided in the aircraft cabin, such that when there is a predetermined pressure difference between the mutually neighbouring pressurised aircraft cabin zones separated from one another by the dividing walls and/or partition floors, they are released from their position and uncover a pressure equilibration opening. The pressure equilibration opening then allows pressure equilibration between the mutually neighbouring pressurised aircraft cabin zones separated from one another by the dividing walls and/or partition floors.

Devices for the releasable fastening of a decompression panel in a dividing wall intended for use in an aircraft cabin, in which a holding element is configured so that it breaks when a predetermined differential pressure acts on the decompression panel, are known from the prior art, for example DE 37 015 328 C1. After the holding element breaks, the decompression panel is released from its position owing to the differential pressure acting on the decompression panel and uncovers a pressure equilibration opening in the dividing wall.

U.S. Pat. No. 5,871,178 and EP 1 186 531 A1, on the other hand, disclose devices for the releasable fastening of a decompression panel in a dividing wall intended for use in an aircraft cabin, which respectively comprise holding elements that hold the decompression panel in its position in the dividing wall by a spring or clamp force. When a predetermined pressure difference acts on the decompression panel, the pressure force acting on the panel exceeds the spring or clamp force applied by the holding elements so that the decompression panel is released from its position in the dividing wall and uncovers a pressure equilibration opening in the dividing wall.

The known devices for fastening a decompression panel in an aircraft cabin dividing wall have the disadvantage that their installation is comparatively elaborate. Furthermore, the holding elements provided in these devices are not universally usable, i.e. they must respectively be configured specially for decompression panels with different shapes and sizes.

It is an object of the present invention to provide an easily installable differential pressure-controlled locking mechanism which is suitable for the releasable fastening of decompression panels with different shapes and sizes in a dividing wall or a partition floor of an aircraft cabin. It is furthermore an object of the invention to provide a decompression panel equipped with such a locking mechanism.

This object is achieved by a differential pressure-controlled locking mechanism having the features specified in Claim 1, and by a decompression panel having the features specified in Claim 14.

The differential pressure-controlled locking mechanism according to the invention comprises a housing, as well as a first pressure chamber which is arranged in the housing and which is connectable to a first ambient zone. The first pressure chamber may for example be connectable to the first ambient zone by at least one first pressure bore formed in the housing, so that the pressure in the first pressure chamber corresponds to the pressure in the first ambient zone during operation of the locking mechanism. The locking mechanism according to the invention furthermore comprises a second pressure chamber, which is arranged in the housing and which is connectable to a second ambient zone. The second pressure chamber may be connectable to the second ambient zone by at least one second pressure bore provided in the housing, so that the pressure in the second pressure chamber corresponds to the pressure in the second ambient zone during operation of the locking mechanism.

The first and second pressure chambers of the locking mechanism are separated from one another by a mobile separating device. When the pressure in the first pressure chamber is equal to the pressure in the second pressure chamber, i.e. no differential pressure is acting on the separating device, the separating device is in an inactive position. When conversely the pressure in the first pressure chamber exceeds the pressure in the second pressure chamber by a predetermined amount or vice versa, i.e. when a predetermined differential pressure acts on the separating device, the separating device is movable from its inactive position into a differential pressure position. When the pressure in the first pressure chamber exceeds the pressure in the second pressure chamber by a predetermined amount, the separating device is displaced from its inactive position in the direction of the second pressure chamber. When conversely the pressure in the second pressure chamber exceeds the pressure in the first pressure chamber by a predetermined amount, the separating device is displaced from its inactive position in the direction of the first pressure chamber. The extent to which the separating device is displaced will depend respectively on the difference between the pressures in the first and second pressure chambers, i.e. the differential pressure acting on the separating device.

The locking mechanism according to the invention furthermore comprises an actuation element, which is held in a first position by the separating device when the separating device is in its inactive position. When conversely the separating device is in a differential pressure position, the actuation element is movable into a second position. The actuation element is preferably movable into its second position both when the separating device is in a differential pressure position displaced from its inactive position in the direction of the first pressure chamber, and when the separating device is in a differential pressure position displaced from its inactive position in the direction of the second pressure chamber. In other words, the actuation element is preferably movable into its second position irrespective of whether the separating device has been displaced from its inactive position into a differential pressure position owing to a pressure in the second pressure chamber exceeding the pressure in the first pressure chamber by a predetermined amount, or owing to a pressure in the first pressure chamber exceeding the pressure in the second pressure chamber by a predetermined amount.

A latch of the differential pressure-controlled locking mechanism, which is adapted for example so that when it is in a locking position it locks a component connected to the locking mechanism in its position, is held in its locking position when the actuation element is in its first position, i.e. when the actuation element is held in its first position by the separating device which is in its inactive position. Conversely, the latch is movable into an unlocking position when the actuation element is in its second position, i.e. when the actuation element is movable into its second position owing to the fact that the separating device is in a differential pressure position.

The locking mechanism according to the invention is advantageously designed in the form of an independently handleable module, and may in principle be used for all applications in which a latch is intended to be moved from a locking position into an unlocking position when a differential pressure between the first and second pressure chambers of the locking mechanism exceeds a predetermined amount. The locking mechanism is compactly constructed and easy to install. Owing to this, the locking mechanism according to the invention is particularly well-suited for fastening a decompression panel releasably in a dividing wall or a partition floor of an aircraft cabin.

Depending on the shape and size of the decompression panel, merely one locking mechanism according to the invention or a multiplicity of locking mechanisms, fitted at different positions on the decompression panel, may be used in order to fasten the decompression panel releasably in the dividing wall or the partition floor of the aircraft cabin. The locking mechanism according to the invention is therefore particularly flexibly usable.

Furthermore, the number of locking mechanisms and their arrangement may be optimised in respect of the weight of the overall system, so that a weight reduction may sometimes even be possible compared with known systems. Lastly, owing to its purely mechanical functionality, the locking mechanism according to the invention is distinguished by a high operational reliability.

The separating device of the differential pressure-controlled locking mechanism according to the invention is preferably designed in the form of a pressure plate separating the first pressure chamber from the second pressure chamber.

Furthermore, the separating device may be biased by the force of a first spring into its inactive position. The first spring is in this case preferably configured so that it holds the separating device in its inactive position as long as a pressure difference between the first and second pressure chambers does not exceed a predetermined amount, i.e. the differential pressure acting on the separating device is less than a predetermined differential pressure. This reliably prevents the separating device being moved from its inactive position into a differential pressure position, in which it allows movement of the actuation element into its second position and consequently movement of the latch into its unlocking position, in the event of minor pressure fluctuations in the first and/or second pressure chamber. With respect to the biasing force applied by it onto the separating device, the first spring is preferably configured in dependence on to the desired predetermined pressure difference, which is necessary in order to move the separating device from its inactive position into a differential pressure position. The triggering behaviour of the locking mechanism according to the invention can therefore be controlled in a straightforward way by a corresponding configuration of the first spring.

In a preferred embodiment of the differential pressure-controlled locking mechanism according to the invention, the actuation element is designed in the form of a retaining pawl which is rotatable about an axis. With such a configuration of the locking mechanism, the actuation element may be held in its first position for example by the cooperation of an edge of the separating device with a bearing surface of the actuation element, when the separating device is in its inactive position. When conversely the separating device is in a differential pressure position, the edge of the separating device may for example disengage from the bearing surface of the actuation element so that the actuation element can rotate about the axis into its second position.

The latch of the locking mechanism according to the invention may be held directly by the actuation element in its locking position when the actuation element is in its first position. Preferably, however, the latch is connected to the actuation element via a transmission. The transmission may be adapted to hold the latch in its locking position when the actuation element is in its first position, and to move the latch into its unlocking position when the actuation element is in its second position. In principle, the locking mechanism according to the invention may employ any transmission which is suitable for transmitting a force exerted by the actuation element or a movement executed by the actuation element onto the latch, in order to hold the latch in its locking position or move it into its unlocking position in dependence on the position of the actuation element.

For example, the transmission may comprise a pressure element which is held in a first position by the actuation element when the actuation element is in its first position. The pressure element of the transmission is preferably movable into a second position by the force of a second spring when the actuation element is in its second position. With such a configuration of the transmission, the actuation element in its first position holds the pressure element in its first position against the force of the second spring. In its second position, conversely, the actuation element releases the pressure element so that the pressure element is displaced into its second position by the force of the second spring.

The pressure element preferably comprises a pressure body and a plunger connected to the pressure body. The pressure body of the pressure element preferably cooperates with the second spring, the first end of which is for example supported on the pressure body and the second end of which is for example supported on the housing of the locking mechanism.

The transmission of the differential pressure-controlled locking mechanism according to the invention may furthermore comprise a knee lever arrangement having a first lever and a second lever connected in an articulated fashion to the first lever. The second lever of the knee lever arrangement is preferably connected in an articulated fashion to the latch at its end remote from the first lever of the knee lever arrangement. In a first position of the knee lever arrangement, the first and second levers of the knee lever arrangement preferably define an angle of approximately 180°, whereas conversely the first and second levers of the knee lever arrangement preferably define an angle which is less than 180° in a second position of the knee lever arrangement. In the first position of the knee lever arrangement, the second lever of the knee lever arrangement can hold the latch in its locking position. In the second position of the knee lever arrangement, conversely, the latch connected to the second lever of the knee lever arrangement is preferably in its unlocking position. The knee lever arrangement has the advantage that it is movable from its first position into its second position by a comparatively small actuation force. Furthermore, the knee lever arrangement is distinguished by rapid response when actuated.

The pressure element is preferably adapted to apply the actuation force, required for actuation of the knee lever arrangement, onto the knee lever arrangement. To actuate the knee lever arrangement, for example, the pressure element may cooperate with the knee lever arrangement in the vicinity of the articulated connection between the first and second levers of the knee lever arrangement, in order to move the knee lever arrangement from its first position in which the first and second levers of the knee lever arrangement define an angle of approximately 180°, into its second position in which the first and second levers of the knee lever arrangement define an angle which is less than 180°. With such a configuration of to the locking mechanism according to the invention, the movement of the actuation element from its first position into its second position is transmitted in a rapid and straightforward way to the latch by the pressure element being moved by the force of the second spring into its second position and thereby actuating the knee lever arrangement.

The first lever of the knee lever arrangement is preferably provided at its end remote from the second lever of the knee lever arrangement with a reception device. The reception device may be adapted to cooperate with a corresponding tool for manual actuation of the knee lever arrangement, i.e. for manual movement of the knee lever arrangement between its first and second positions. For example a slot or a crosshead slot for cooperating with a corresponding screwdriver, or a hexagon socket for cooperating with a corresponding hexagon socket spanner, may be formed on the first lever of the knee lever arrangement. In this way, the locking mechanism according to the invention may readily be locked manually for example when installing a component to be fastened in a desired position by means of the locking mechanism, in order to fix the component in the desired position. Furthermore, for example for maintenance purposes, the locking mechanism may be manually released i.e. the latch of the locking mechanism may be moved from its locking position into its unlocking position. A component fastened by means of the locking mechanism may then be released from its position conveniently and without damaging the component or the locking mechanism.

A bore, which is adapted to allow corresponding tool access to the reception device formed on the first lever of the knee lever arrangement, is preferably formed in the housing of the locking mechanism. With such a configuration of the locking mechanism according to the invention, opening the housing for manual actuation of the knee lever arrangement may be obviated.

The second lever of the knee lever arrangement may be connected to the latch at its end remote from the first lever of the knee lever arrangement. Preferably, however, the second lever of the knee lever arrangement is connected to the latch at its end remote from the first lever of the knee lever arrangement by a connecting element, for example designed in the form of a rod. There is preferably an articulated connection between the second lever of the knee lever arrangement and the connecting element, whereas a rigid connection is preferably provided between the connecting element and the latch.

The latch may be biased in a locking direction by the force of a third spring. A first end of the third spring may for example be supported on the connecting element, i.e. on a projection formed on the connecting element, for example a radially outwardly projecting flange of the connecting element. A second end of the third spring, conversely, may be supported on the latch. Manufacturing and installation tolerances of the locking mechanism, and of the components to be connected together by means of the locking mechanism, may be compensated for in a straightforward way by the biasing force applied on the latch by the spring. The locking mechanism according to the invention, and a component to be fastened in a desired position by means of the locking mechanism, are therefore particularly simple to install since elaborate adjustment work can be substantially obviated.

In a preferred embodiment of the differential pressure-controlled locking mechanism according to the invention, a viewing window, which is adapted to allow visual inspection of the operational state of the locking mechanism, is formed in the housing. For example, the viewing window may be arranged and shaped so that visual inspection of the actuation state of the knee lever arrangement is possible. As an alternative or in addition to this, the housing of the locking mechanism according to the invention may however also have a viewing window which is adapted to allow visual inspection of the actuation state of the actuation element or the pressure element.

A decompression panel according to the invention comprises at least one differential pressure-controlled locking mechanism as described above. Depending on the shape and size of the decompression panel, the decompression panel may however also comprise a plurality of locking mechanisms.

The locking mechanism or locking mechanisms is/are preferably connected to the decompression panel in order to fasten the decompression panel releasably in a dividing wall or a partition floor of an aircraft cabin.

A preferred embodiment of a differential pressure-controlled locking mechanism according to the invention will now be explained in more detail with the aid of the appended schematic drawings, in which.

Figure 5:
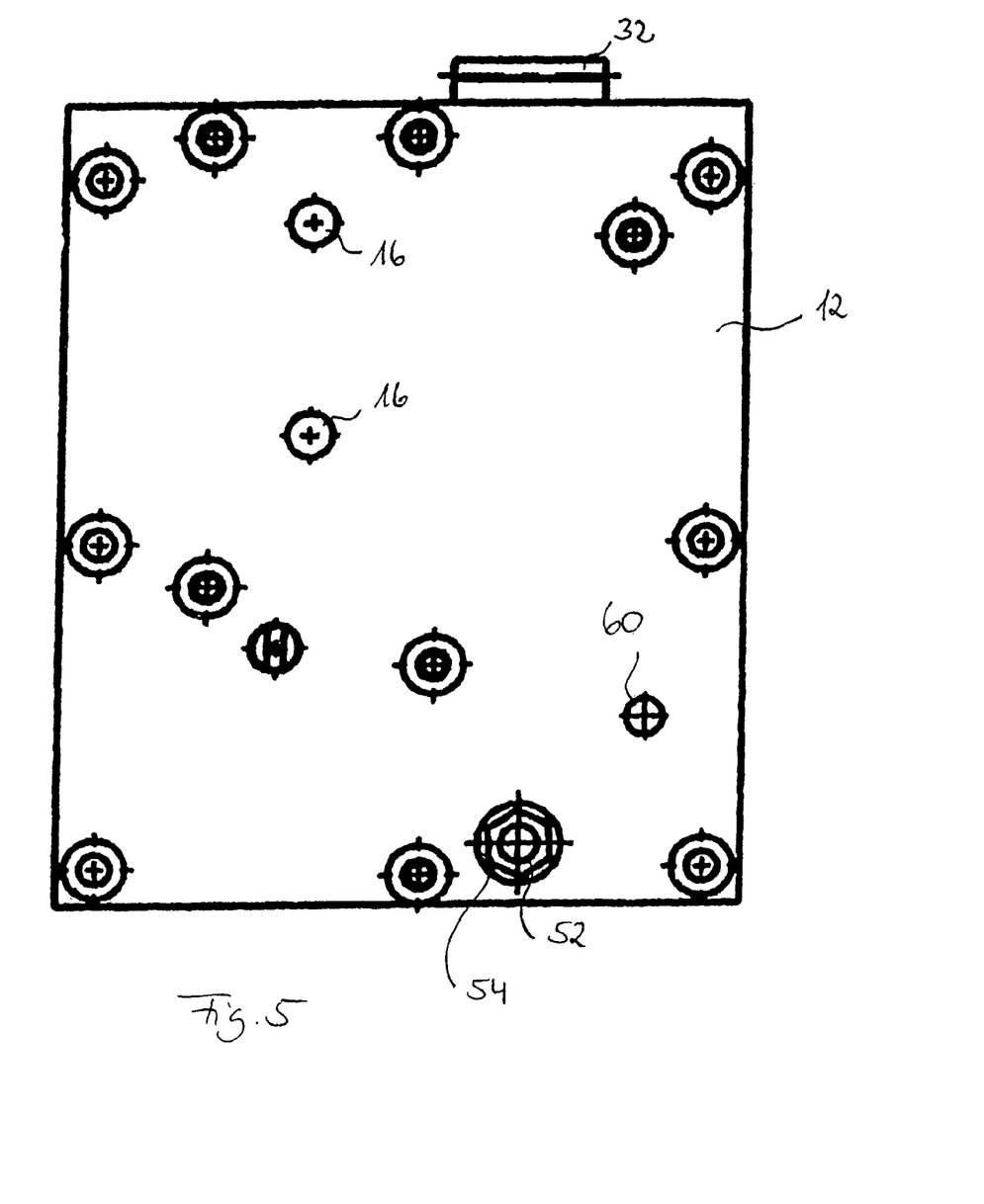
FIG. 5 shows a plan view of a lower housing side of a locking mechanism according to the invention.
Figure 6:
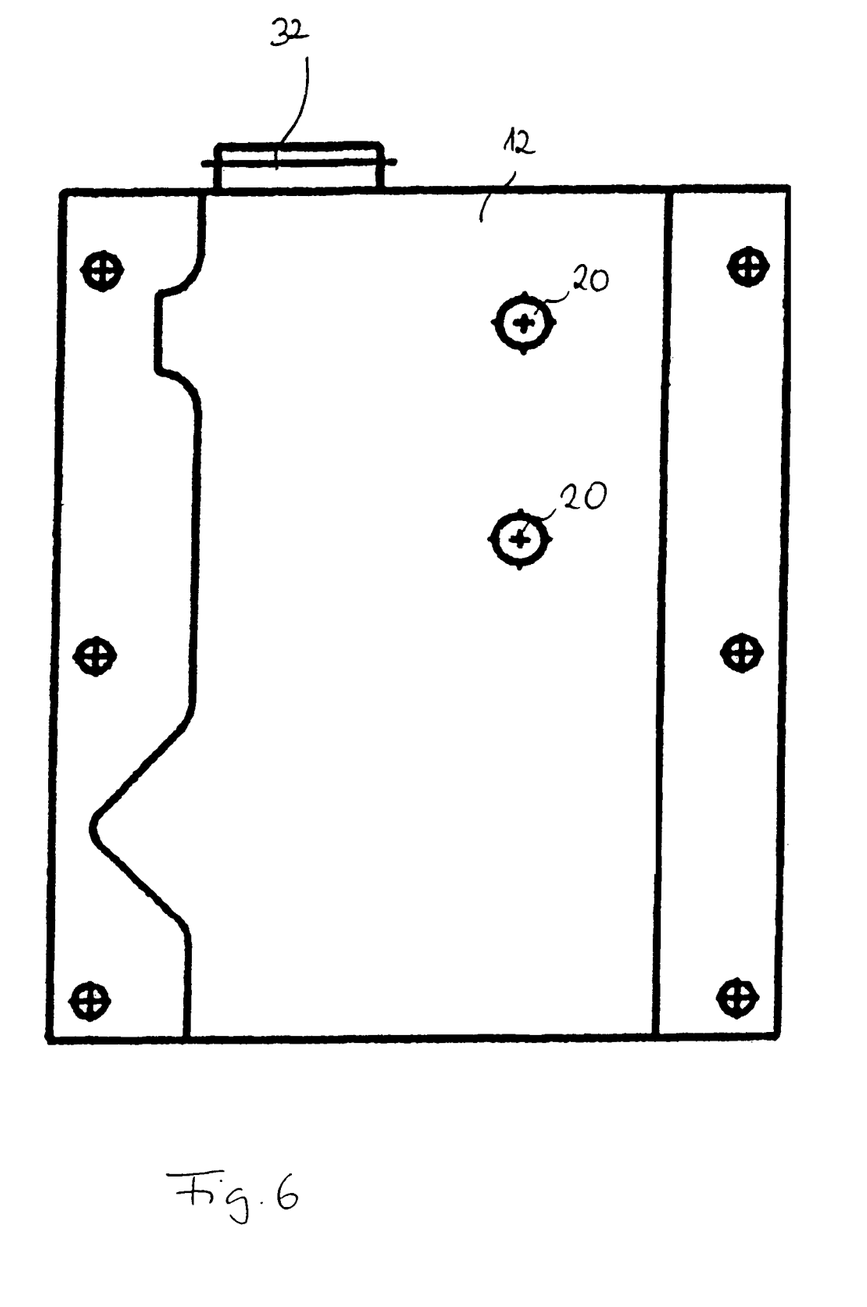
FIG. 6 shows a plan view of an upper housing side of a locking mechanism according to the invention.

A locking mechanism 10 shown in the figures comprises a housing 12, in which a first pressure chamber 14 is arranged. The first pressure chamber 14 is connectable to a first ambient zone through first pressure bores 16 formed in the housing 12 (see FIG. 5), so that a pressure in the first pressure chamber 14 always corresponds to the pressure in the first ambient zone. The first pressure chamber 14 is separated from a second pressure chamber (not represented in the figures) by a separating device 18 designed in the form of a pressure plate. The second pressure chamber is connectable to a second ambient zone through second pressure bores 20 formed in the housing 12 (see FIG. 6), so that the pressure in the second pressure chamber always corresponds to the pressure in the second ambient zone.

Figure 1:
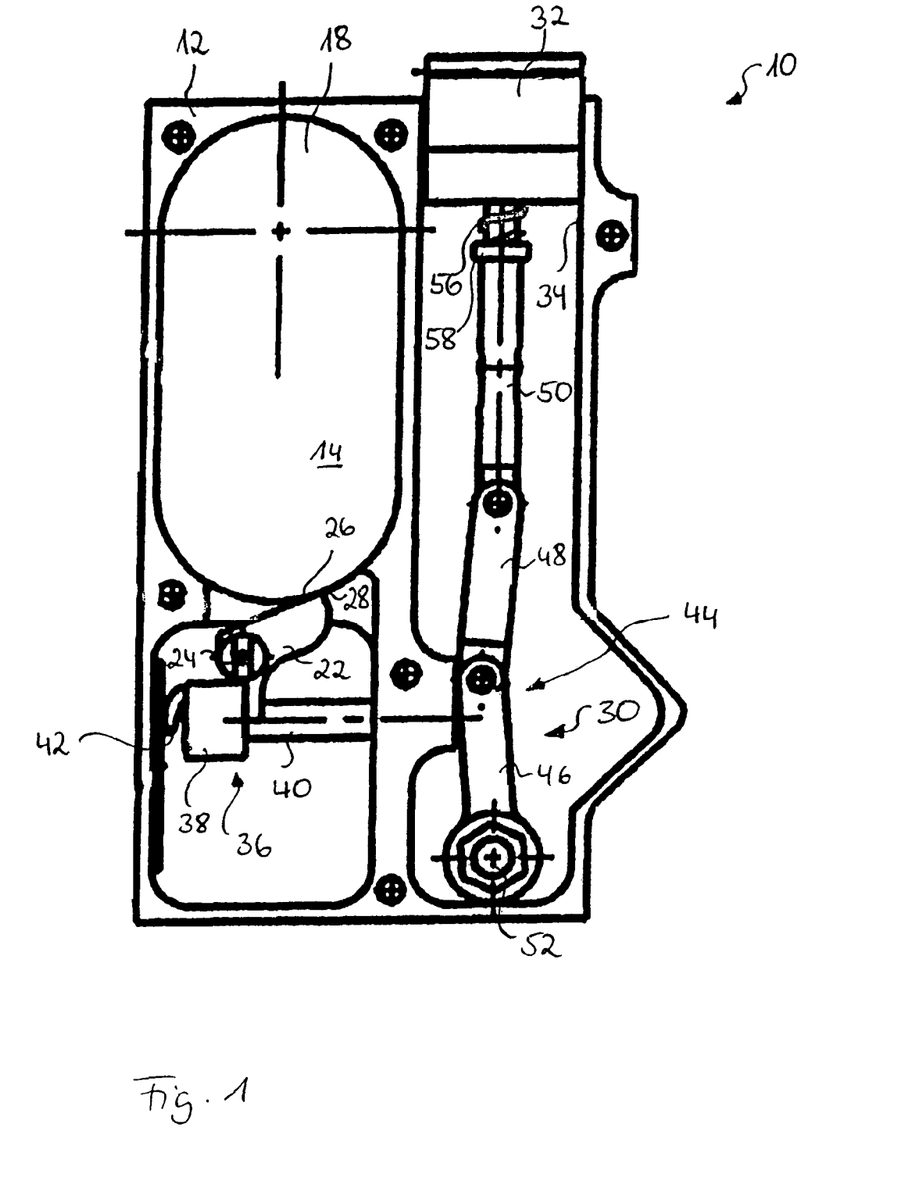
FIG. 1 shows a plan view of a locking mechanism according to the invention in the locked state.
Figure 2:
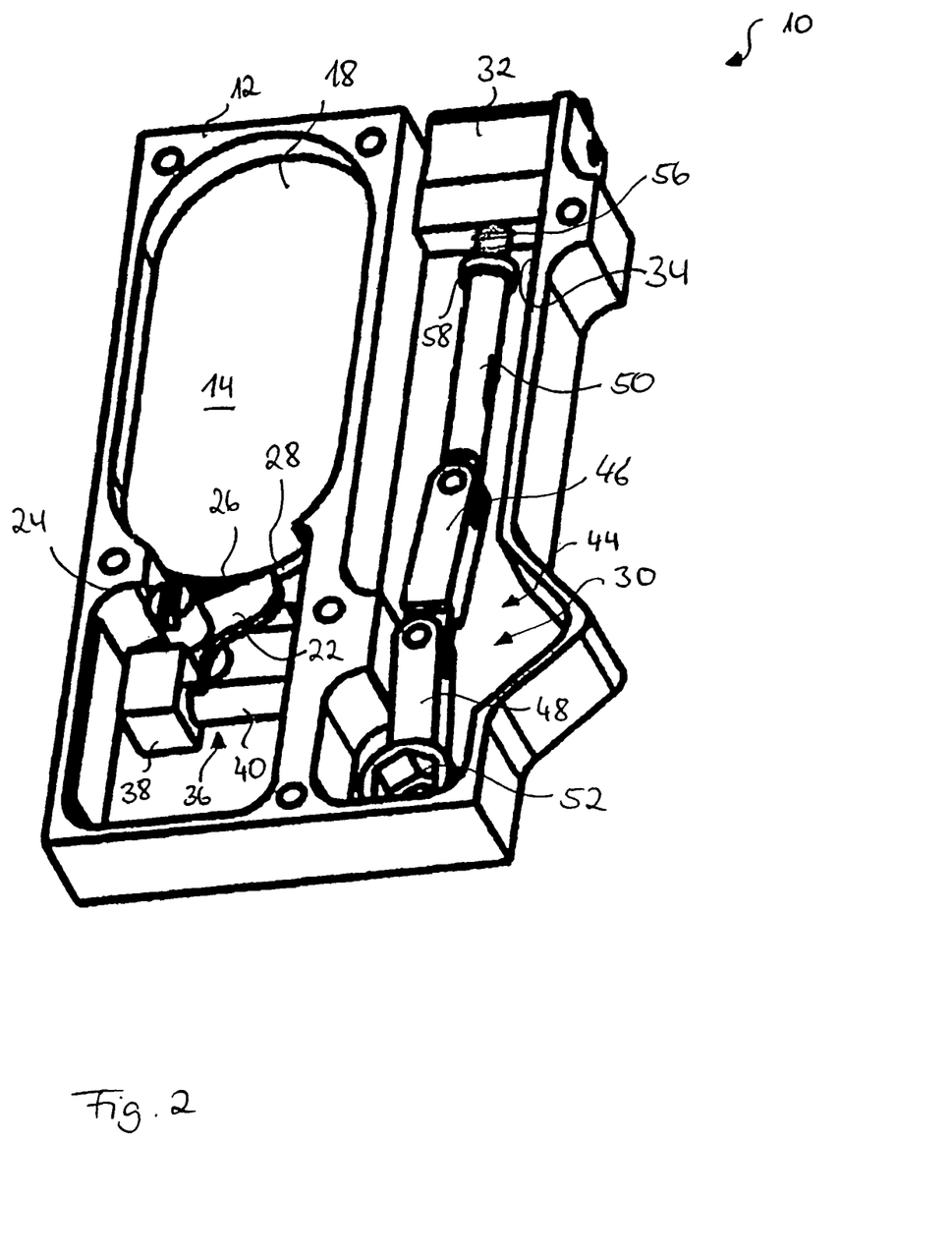
FIG. 2 shows a perspective view of the locking mechanism according to FIG. 1.

The separating device 18 of the locking mechanism 10 is in an inactive position, shown in FIGS. 1 and 2, when the pressure in the first pressure chamber 14 is equal to the pressure in the second pressure chamber. The separating device is biased into its inactive position by the force of a first spring (not shown in the figures). When conversely a pressure difference between the first pressure chamber 14 and the second pressure chamber exceeds a predetermined amount, i.e. when a predetermined pressure difference acting on the separating device 18 exceeds the biasing force of the first spring, the separating device 18 moves from its inactive position into a differential pressure position.

Figure 3:
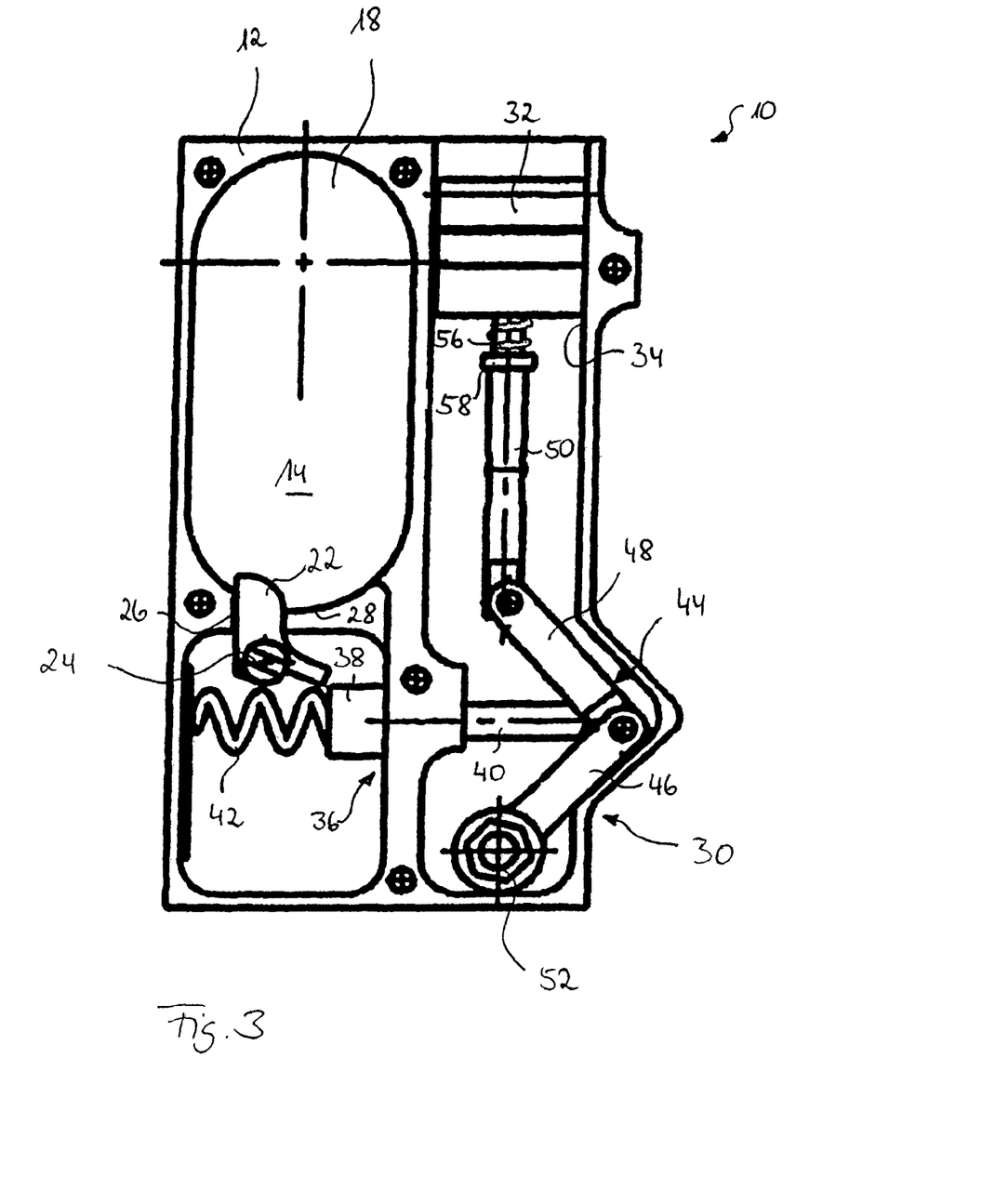
FIG. 3 shows a plan view of a locking mechanism according to the invention in the unlocked state.
Figure 4:
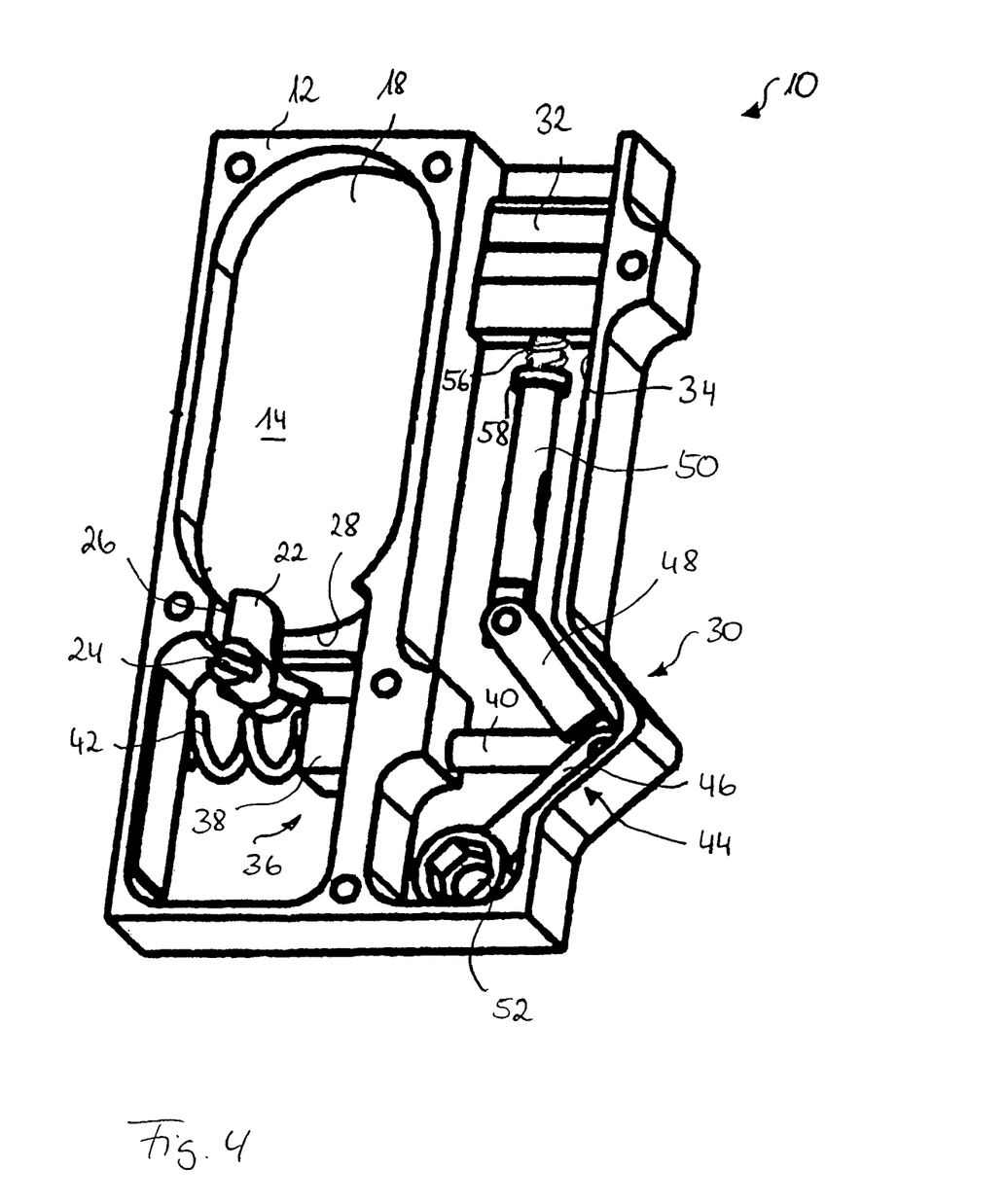
FIG. 4 shows a perspective view of the locking mechanism according to FIG. 3.

FIGS. 3 and 4 show the separating device 18 in a differential pressure position, which the separating device 18 occupies when the pressure in the first pressure chamber 14 exceeds the pressure in the second pressure chamber so much that the differential pressure acting on the separating device 18 is sufficient to displace the separating device 18, against the force of the first spring, from its inactive position in the direction of the second pressure chamber into a differential pressure position. Similarly, the separating device 18 can be displaced from its inactive position in the direction of the first pressure chamber 14 when the pressure in the second pressure chamber exceeds the pressure in the first pressure chamber 14 so much that the differential pressure acting on the separating device 18 exceeds the biasing force of the first spring biasing the separating device 18 into its inactive position.

The locking mechanism 10 furthermore comprises an actuation element 22 designed in the form of a retaining pawl. The actuation element 22, which is rotatable about an axis 24, comprises a bearing surface 26 which cooperates with an edge 28 of the separating device 18 when the separating device 18 is in its inactive position shown in FIGS. 1 and 2. By the cooperation of the bearing surface 26 with the edge 28 of the separating device 18, the actuation element 22 is held in its first position shown in FIGS. 1 and 2. When conversely the separating device 18 is in a differential pressure position, i.e. it is displaced from its inactive position in the direction of the first pressure chamber 14 or in the direction of the second pressure chamber, the bearing surface 26 of the actuation element 22 and the edge 28 of the separating device 18 disengage so that the actuation element 22 is freely rotatable about the axis 24.

The actuation element 22 is connected via a transmission 30 to a latch 32. The latch 32 is displacable in a guide 34 formed in the housing 12, between a locking position shown in FIGS. 1 and 2 and an unlocking position shown in FIGS. 3 and 4. In its locking position, the latch 32 may for example be used to fasten a component connected to the locking mechanism 10, for example a decompression panel, in a desired position, for example in a dividing wall or a partition floor in an aircraft cabin.

When conversely the latch 32 is in its unlocking position, the component connected to the locking mechanism 10 is no longer fixed in its position and can therefore be released from its position for example by a differential pressure acting on the component.

The transmission 30 comprises a pressure element 36, which has a pressure body 38 and a plunger 40 connected rigidly to the pressure body 38. A first end of a second spring 42 is braced on the pressure body 38. A second end of the second spring 42, conversely, is supported on the housing 12 of the locking mechanism 10. As may be seen from FIGS. 1 and 2, the pressure element 36 is held in a first position by the cooperation of the actuation element 22 with the pressure body 38 of the pressure element 36, against the force of the second spring 42, when the actuation element 22 is fixed in its first position by the separating device 18 being in its inactive position. When conversely, as shown in FIGS. 3 and 4, the actuation element 22 is not being held in its first position by the separating device 18 but is freely rotatable about the axis 24 into a second position, the pressure element 36 is moved into a second position by the force of the second spring 42.

The plunger 40 of the pressure element 36 cooperates with a knee lever arrangement 44. The knee lever arrangement 44 comprises a first lever 46 and a second lever 48, connected to the first lever in an articulated fashion. At its end remote from the first lever 46, the second lever 48 of the knee lever arrangement 44 is connected to the latch 32 via a connecting element 50 designed in the form of a rod.

The plunger 40 of the pressure element 36 cooperates with the knee lever arrangement 44 in the vicinity of the articulated connection between the first and second levers 46, 48 of the knee lever arrangement 44, in order to move the knee lever arrangement from a first position shown in FIGS. 1 and 2 into a second position shown in FIGS. 3 and 4. In the first position of the knee lever arrangement 44, the first and second levers 46 and 48 define an angle of approximately 180°. In the second position of the knee lever arrangement 44, conversely, the first and second levers 46 and 48 define an angle which is less than 180°. The latch 32, connected to the knee lever arrangement 44 via the connecting element 50, is therefore displaced in the guide 34 from its locking position shown in FIGS. 1 and 2 into its unlocking position shown in FIGS. 3 and 4 when the knee lever arrangement 44 is moved from its first position into its second position by the cooperation with the plunger 40 of the pressure element 36.

At its end remote from the second lever 48, the first lever 46 of the knee lever arrangement 44 is provided with a reception device 52 designed in the form of a hexagon socket. As may be seen from FIG. 5, the housing 12 of the locking mechanism 10 has a bore 54 corresponding with the reception device 52. For manual actuation of the knee lever arrangement between its first and second positions, a tool can therefore be inserted into the reception device 52 without the housing 12 needing to be opened for this.

The latch 32 connected to the connecting element 50 is biased in a locking direction by the force of a third spring 56. A first end of the third spring 56 is supported on a radially outwardly projecting flange 58 formed on the connecting element 50. A second end of the third spring 56, conversely, is supported on the latch 32. Manufacturing and installation tolerances of the locking mechanism, and of the components to be connected together by means of the locking mechanism, may be compensated for in a straightforward way by the biasing force applied on of the latch 32 by the spring.

Lastly, a viewing window 60 (see FIG. 5) is formed in the housing 12 of the locking mechanism 10. The viewing window 60 allows visual inspection of the actuation state of the knee lever arrangement 44 and therefore visual inspection of the operational state of the locking mechanism 10.

The locking mechanism 10 may be used in order to fasten a decompression panel releasably in a dividing wall or a partition floor of an aircraft cabin. Depending on the shape and size of the decompression panel, merely a single locking mechanism 10 or a multiplicity of locking mechanisms 10 may be used for this. Each locking mechanism 10 is connected to the decompression panel so that, in the installed state of the decompression panel, the first pressure chamber 14 of the locking mechanism 10 is connected to a first zone of the aircraft cabin, whereas the second pressure chamber of the locking mechanism 10 is connected to a second aircraft cabin zone separated from the first zone by the dividing wall or the partition floor. A pressure prevailing in the first zone of the aircraft cabin is therefore transmitted directly to the first pressure chamber 14 of each locking mechanism 10, whereas a pressure prevailing in the second zone of the aircraft cabin is transmitted directly to the second pressure chamber of each locking mechanism 10.

During normal operation of the aircraft, i.e. when there is no pressure difference between the first and second zones of the aircraft cabin, in the installed state of the decompression panel each locking mechanism 10 is in its operational state shown in FIGS. 1 and 2, in which the latch 32 holds the decompression panel in its position in the dividing wall or the partition floor.

In the event of a decompression in the first or second zone of the aircraft cabin, the pressure difference which builds up between the first and second zones of the aircraft cabin is transmitted directly to the first and second pressure chambers 14 of each locking mechanism 10. Owing to the differential pressure which then acts, the separating device 18 is displaced from its inactive position shown in FIGS. 1 and 2 into a differential pressure position, in which the edge 28 of the separating device 18 is no longer engaged with the bearing surface 26 of the actuation element 22.

When the actuation element 22 is freely rotatable about the axis 24, the pressure element 36 is no longer held in its first position by the actuation element 22. Instead, the pressure element 36 is pressed by the force of the second spring 42 into its second position, in which the plunger 40 of the pressure element 36 moves the knee lever arrangement 44 from its first position into its second position. The latch 32 connected to the knee lever arrangement 44 via the connecting element 50 is thereby moved in the guide 34 into its unlocking position, so that the decompression panel is no longer fixed in its position in the dividing wall or the partition floor.

Owing to the differential pressure which acts on the decompression panel, the decompression panel is then released from its position in the dividing wall or the partition floor, and uncovers a pressure equilibration opening in the dividing wall separating the first zone from the second zone of the aircraft cabin, or the partition floor separating the first zone from the second zone of the aircraft cabin.

The invention claimed is:

1. A differential pressure-controlled locking mechanism, having:
    a housing;
    a first pressure chamber which is arranged in the housing and which is connectable to a first ambient zone;
    a second pressure chamber which is arranged in the housing, which is connectable to a second ambient zone and which is separated from the first pressure chamber by a mobile separating device, the separating device being in an inactive position when the pressure in the first pressure chamber is equal to the pressure in the second pressure chamber, and the separating device being movable from its inactive position into a differential pressure position when a predetermined differential pressure acts on the separating device;
    an actuation element which is held in a first position by the separating device when the separating device is in its inactive position, and which is movable into a second position when the separating device is in a differential pressure position; and
    a latch which is held in a locking position when the actuation element is in its first position, and which is movable into an unlocking position when the actuation element is in its second position, wherein the actuation element is designed in the form of a retaining pawl which is rotatable about an axis, wherein the separating device is designed in the form of a pressure plate, which is biased by the force of a first spring into its inactive position.

2. The locking mechanism according to claim 1, wherein the latch is connected to the actuation element via a transmission, the transmission being adapted to hold the latch in its locking position when the actuation element is in its first position, and to move the latch into its unlocking position when the actuation element is in its second position.

3. The locking mechanism according to claim 2, wherein the transmission comprises a pressure element which is held in a first position by the actuation element when the actuation element is in its first position, and which is movable into a second position by the force of a second spring when the actuation element is in its second position.

4. The locking mechanism according to claim 3, wherein the pressure element comprises a pressure body and a plunger connected to the pressure body.

5. The locking mechanism according to claim 2, wherein the transmission comprises a knee lever arrangement having a first lever and a second lever connected in an articulated fashion to the first lever, the second lever of the knee lever arrangement being connected in an articulated fashion to the latch at its end remote from the first lever of the knee lever arrangement.

6. The locking mechanism according to claim 3, wherein the pressure element is adapted to cooperate with the knee lever arrangement in the vicinity of the articulated connection between the first and second levers of the knee lever arrangement to actuate the knee lever arrangement, in order to move the knee lever arrangement from a first position, in which the first and second levers of the knee lever arrangement define an angle of approximately 180°, into a second position in which the first and second levers of the knee lever arrangement define an angle which is less than 180°.

7. The locking mechanism according to claim 5, wherein the first lever of the knee lever arrangement is provided at its end remote from the second lever of the knee lever arrangement with a reception device, which is adapted to cooperate with a corresponding tool for manual actuation of the knee lever arrangement.

8. The locking mechanism according to claim 7, wherein a bore, which is adapted to allow a corresponding tool access to the reception device formed on the first lever of the knee lever arrangement, is formed in the housing of the locking mechanism.

9. The locking mechanism according to claim 5, wherein the second lever of the knee lever arrangement is connected via a connecting element to the latch at its end remote from the first lever of the knee lever arrangement.

10. The locking mechanism according to claim 1, wherein the latch is biased in a locking direction by the force of a third spring.

11. The locking mechanism according to claim 1, wherein a viewing window, which is adapted to allow visual inspection of the operational state of the locking mechanism, is formed in the housing of the locking mechanism.

12. Decompression panel, comprising at least one differential pressure-controlled locking mechanism according to claim 1.

13. A differential pressure-controlled locking mechanism, having:
- a housing;
- a first pressure chamber which is arranged in the housing and which is connectable to a first ambient zone;
- a second pressure chamber which is arranged in the housing, which is connectable to a second ambient zone and which is separated from the first pressure chamber by a mobile separating device, the separating device being in an inactive position when the pressure in the first pressure chamber is equal to the pressure in the second pressure chamber, and the separating device being movable from its inactive position into a differential pressure position when a predetermined differential pressure acts on the separating device;
- an actuation element which is held in a first position by the separating device when the separating device is in its inactive position, and which is movable into a second position when the separating device is in a differential pressure position; and
- a latch which is held in a locking position when the actuation element is in its first position, and which is movable into an unlocking position when the actuation element is in its second position, wherein the actuation element is designed in the form of a retaining pawl which is rotatable about an axis and the latch is connected to the actuation element via a transmission, the transmission being adapted to hold the latch in its locking position when the actuation element is in its first position, and to move the latch into its unlocking position when the actuation element is in its second position.

14. A differential pressure-controlled locking mechanism, having:
- a housing;
- a first pressure chamber which is arranged in the housing and which is connectable to a first ambient zone;
- a second pressure chamber which is arranged in the housing, which is connectable to a second ambient zone and which is separated from the first pressure chamber by a mobile separating device, the separating device being in an inactive position when the pressure in the first pressure chamber is equal to the pressure in the second pressure chamber, and the separating device being movable from its inactive position into a differential pressure position when a predetermined differential pressure acts on the separating device;
- an actuation element which is held in a first position by the separating device when the separating device is in its inactive position, and which is movable into a second position when the separating device is in a differential pressure position; and
- a latch which is held in a locking position when the actuation element is in its first position, and which is movable into an unlocking position when the actuation element is in its second position, wherein the actuation element is designed in the form of a retaining pawl which is rotatable about an axis and the latch is biased in a locking direction by the force of a third spring.

* * * * *